US011573422B2

(12) United States Patent
Alasaarela

(10) Patent No.: US 11,573,422 B2
(45) Date of Patent: Feb. 7, 2023

(54) NEAR-EYE DISPLAY SYSTEM HAVING MULTIPLE PASS IN-COUPLING FOR WAVEGUIDE DISPLAY

(71) Applicant: Microsoft Technology Licensing, LLC, Redmond, WA (US)

(72) Inventor: Tapani Matias Alasaarela, Espoo (FI)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/340,742

(22) Filed: Jun. 7, 2021

(65) Prior Publication Data
US 2022/0390744 A1 Dec. 8, 2022

(51) Int. Cl.
G02B 27/01 (2006.01)
G06T 19/00 (2011.01)
(Continued)

(52) U.S. Cl.
CPC ....... G02B 27/0172 (2013.01); G02B 6/0078 (2013.01); G02B 6/4291 (2013.01); G06T 19/006 (2013.01); G02B 2027/0138 (2013.01)

(58) Field of Classification Search
CPC .......... G01B 11/14; G01B 11/22; G01J 3/506; G02B 27/01; G02B 27/017;
(Continued)

(56) References Cited

U.S. PATENT DOCUMENTS

| 6,937,780 B2 | 8/2005 | Alphonse |
| 7,050,231 B2 | 5/2006 | Matsushita et al. |
| 7,181,108 B2 | 2/2007 | Levola |
| 9,535,253 B2 | 1/2017 | Levola et al. |

(Continued)

FOREIGN PATENT DOCUMENTS

| WO | 2017105868 A1 | 6/2017 |
| WO | 2018234609 A1 | 12/2018 |

OTHER PUBLICATIONS

Lv, et al., "Integrated Holographic Waveguide Display System with a Common Optical Path for Visible and Infrared Light", In Journal of Optics Express, vol. 26, Issue 25, Dec. 10, 2018, 10 Pages.
(Continued)

Primary Examiner — Nelson M Rosario

(57) ABSTRACT

A waveguide display for use in a near-eye display system includes a waveguide stack having at least one waveguide substrate, an input coupler coupling light into the waveguide substrate and an optical arrangement that includes a birefringent reflective polarizer, a mirror and a polarization state converting element configured to convert light in a linear polarization state to a circular polarization state and to convert light in a circular polarization state to a linear polarization state. The mirror is arranged to receive light from the polarization state converting element and reflect the light back to the polarization state converting element. The optical arrangement causes a transmission path of light that traverses the waveguide stack a first time to be folded back through the waveguide stack such that at least a portion of light not coupled into the waveguide substrate is caused to traverse the waveguide stack a plurality of additional times.

18 Claims, 12 Drawing Sheets

(51) Int. Cl.
*F21V 8/00* (2006.01)
*G02B 6/42* (2006.01)

(58) Field of Classification Search
CPC ...... G02B 2027/011; G02B 2027/0178; G06F 3/013; G06F 2203/011; G06T 15/20; G06T 19/006; G06T 2207/10012; G06T 2207/10052; G06T 3/20; G06T 3/40; G06T 3/60; G09G 3/003; G09G 3/006; G09G 5/02; G09G 2320/0233; G09G 2320/0242; G09G 2320/0276; G09G 2320/028; G09G 2320/029; G09G 2320/0626; G09G 2320/0666; G09G 2320/0673; G09G 2320/0693; G09G 2340/0464; G09G 2360/16; G09G 3/2092; G09G 3/3406; H04N 13/144; H04N 13/324; H04N 13/327; H04N 13/344; H04N 13/383; H04N 13/398; H04N 13/395
See application file for complete search history.

(56) References Cited

U.S. PATENT DOCUMENTS

| | | | |
|---|---|---|---|
| 9,857,170 | B2 | 1/2018 | Abovitz et al. |
| 10,175,489 | B1 | 1/2019 | Robbins et al. |
| 10,338,400 | B2 * | 7/2019 | Connor .............. G02B 27/0172 |
| 2005/0180674 | A1 | 8/2005 | Ellwood, Jr. |
| 2012/0200499 | A1 | 8/2012 | Osterhout et al. |
| 2020/0371370 | A1 * | 11/2020 | Ouderkirk ............ G02B 5/3016 |

OTHER PUBLICATIONS

"How do 3M's solutions address your key needs?", Retrieved From: https://multimedia.3m.com/mws/media/1512969O/display-materials-systems-display-solutions-for-smart-phones.pdf, Retrieved Date: Sep. 27, 2022, 2 Pages.

"International Search Report and Written Opinion Issued in PCT Application No. PCT/US22/028419", dated Sep. 12, 2022, 12 Pages.

* cited by examiner

NEAR-EYE DISPLAY SYSTEM HAVING MULTIPLE PASS IN-COUPLING FOR WAVEGUIDE DISPLAY

BACKGROUND

Mixed-reality computing devices, such as wearable head mounted display (HMD) systems and mobile devices (e.g. smart phones, tablet computers, etc.), may be configured to display information to a user about virtual and/or real objects in a field of view of the user and/or a field of view of a camera of the device. For example, an HVID device may be configured to display, using a see-through display system, virtual environments with real-world objects mixed in, or real-world environments with virtual objects mixed in.

SUMMARY

In embodiments, a near eye display system includes a waveguide display that presents to the eyes of a viewer mixed-reality or virtual-reality images. The waveguide display includes two or more waveguide plates that are stacked over one another with an air gap between them. In certain embodiments each of the waveguide plates in the stack is used to transfer different wavelengths or colors of light to the viewer. The waveguide plates each include a transparent substrate and input and output couplers such as diffractive optical elements (DOEs) for coupling light into and out of the waveguide substrates, respectively. Typically, the image only passes through the input couplers of the waveguide stack a single time, thereby limiting the efficiency of the in-coupling. Sometimes a mirror is provided behind the input couplers to increase the amount of light coupled into the waveguide plates. In some illustrative embodiments the efficiency of the in-coupling of the light to the waveguide plates is increased by folding the transmission path of the light through the waveguide stack so that some of the light in the main beam is able to traverse the waveguide stack up to four times.

In certain embodiments the transmission path is folded using the polarization of light. For instance, if the image light is in a first linear polarization state, a birefringent reflective polarizer is used to direct the image light to the waveguide stack. The birefringent reflective polarizer transmits the light in the first linear polarization state and reflects light in a second linear polarization state orthogonal to the first linear polarization state. After traversing the waveguide stack, any light not in-coupled to the waveguide plates exits the waveguide stack and is converted to circularly polarized light by a polarization state converting element such as an achromatic wide-angle quarter-wave plate at a 45° orientation. The circularly polarized light is then reflected by a mirror back to the quarter-wave plate with its phase reversed. The quarter-wave plate converts the light to the second linear polarization state and directs it back through the waveguide stack. In this way the transmission path can be folded back through the waveguide stack so that at least a portion of the light that has not yet been in-coupled to the waveguide plates traverses the waveguide stack two or more additional times.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. These and various other features will be apparent from a reading of the following Detailed Description and a review of the associated drawings.

DESCRIPTION OF THE DRAWINGS

Like reference numerals indicate like elements in the drawings. Elements are not drawn to scale unless otherwise indicated.

DETAILED DESCRIPTION

Figure 1:
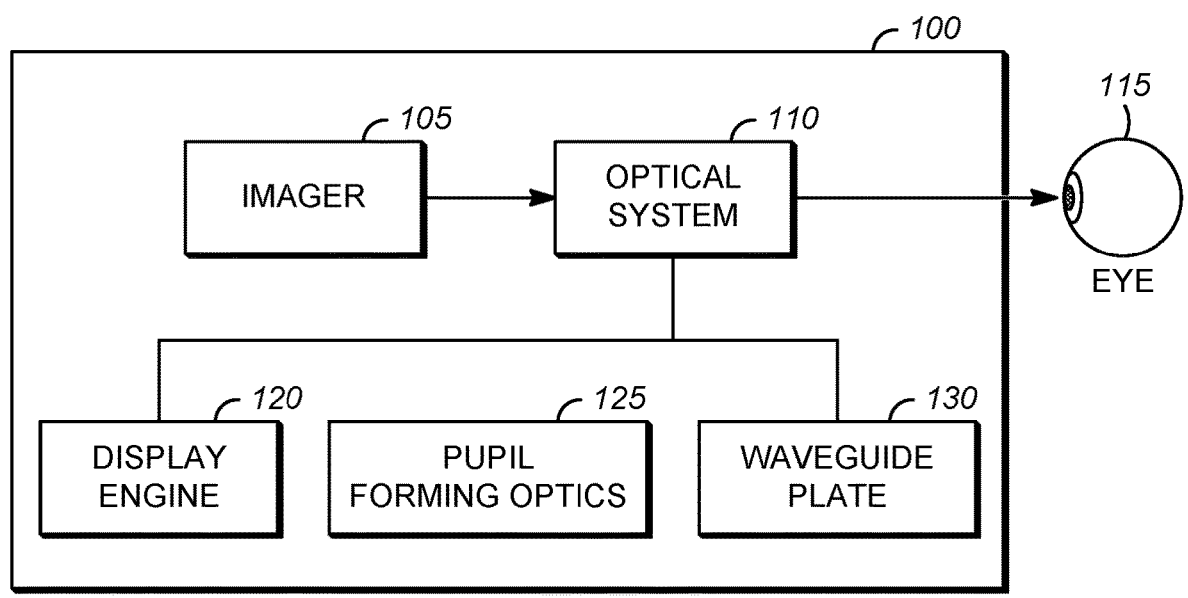
FIG. 1 shows a block diagram of an illustrative near-eye optical display system.

FIG. 1 shows a block diagram of an illustrative near-eye optical display system 100 which may incorporate a combination of optical couplers such as diffractive optical elements (DOEs) that provide in-coupling of incident light into a waveguide plate, exit pupil expansion in two directions, and out-coupling of light out of the waveguide plate. Near-eye optical display systems are often used, for example, in head mounted display (HMD) devices in industrial, commercial, and consumer applications. Other devices and systems may also use near-eye display systems, as described below. The near-eye optical display system 100 is an example that is used to provide context and illustrate various features and aspects of the present compact display engine with MEMS scanners.

System 100 may include one or more imagers (representatively indicated by reference numeral 105) that work with an optical system 110 to deliver images as a virtual display to a user's eye 115. The imager 105 may include, for example, RGB (red, green, blue) light emitting diodes (LEDs), LCOS (liquid crystal on silicon) devices, OLED (organic light emitting diode) arrays, lasers, laser diodes, or any other suitable displays or micro-displays operating in transmission, reflection, or emission. The optical system 110 can typically include a display engine 120, pupil forming optics 125, and one or more waveguide plates 130. The imager 105 may include or incorporate an illumination unit and/or light engine (not shown) that may be configured to provide illumination in a range of wavelengths and intensities in some implementations.

In a near-eye optical display system the imager 105 does not actually shine the images on a surface such as a glass lens to create the visual display for the user. This is not feasible because the human eye cannot focus on something that is that close. Rather than create a visible image on a surface, the near-eye optical display system 100 uses the pupil forming optics 125 to form a pupil and the eye 115 acts as the last element in the optical chain and converts the light from the pupil into an image on the eye's retina as a virtual display.

The waveguide plate 130 facilitates light transmission between the imager and the eye. One or more waveguide plates can be utilized in the near-eye optical display system because they are transparent and because they are generally small and lightweight (which is desirable in applications such as HMD devices where size and weight is generally sought to be minimized for reasons of performance and user comfort). For example, the waveguide plate 130 can enable the imager 105 to be located out of the way, for example, on the side of the user's head or near the forehead, leaving only a relatively small, light, and transparent waveguide optical element in front of the eyes. The waveguide plate 130 operates using a principle of total internal reflection (TIR).

Figure 2:
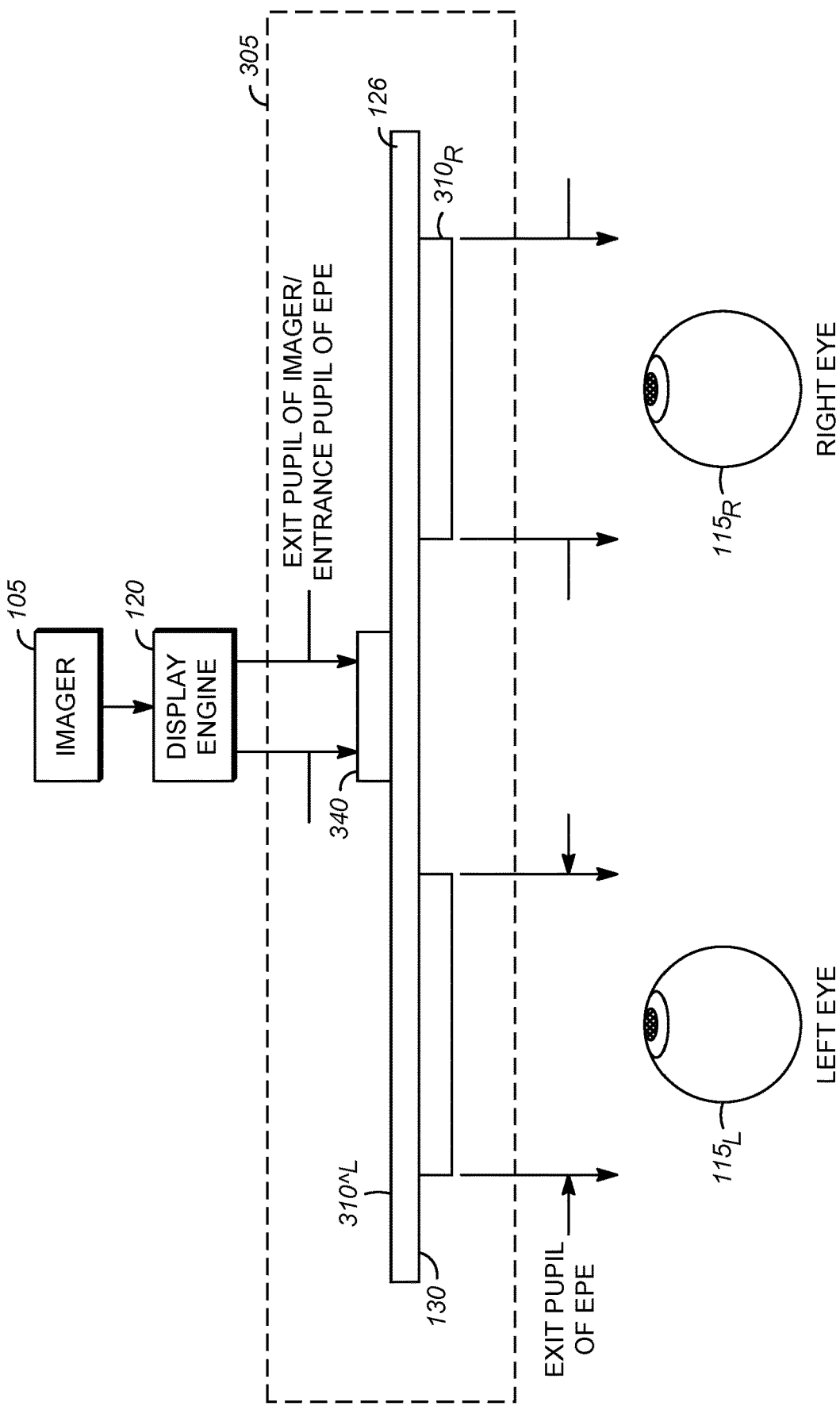
FIG. 2 shows a view of an illustrative exit pupil expander.

FIG. 2 shows a view of an illustrative exit pupil expander (EPE) 305 that may be used in the pupil forming optics 125 shown in FIG. 1. EPE 305 receives an input optical beam from the imager 105 and the display engine 120 as an entrance pupil to produce one or more output optical beams with expanded exit pupil in one or two directions relative to the input (in general, the input may include more than one optical beam which may be produced by separate sources). The display engine replaces magnifying and/or collimating optics that are typically used in conventional display systems. The expanded exit pupil typically facilitates a virtual display to be sufficiently sized to meet the various design requirements such as image resolution, field of view, and the like of a given optical system while enabling the imager and associated components to be relatively light and compact.

The EPE 305 is configured, in this illustrative example, to provide binocular operation for both the left and right eyes which may support stereoscopic viewing. Components that may be utilized for stereoscopic operation such as scanning mirrors, lenses, filters, beam splitters, MEMS devices, or the like are not shown in FIG. 3 for sake of clarity in exposition. The EPE 305 utilizes a waveguide display with a waveguide plate 130 that includes a transparent substrate 126, two out-coupling gratings, $310_L$ and $310_S$ and a central in-coupling grating 340 that are supported on or in the substrate 126. The substrate 126 may be made, for instance, from glass or plastic. The in-coupling and out-coupling gratings may be configured using multiple DOEs. Each DOE is an optical element comprising a periodic structure that can modulate various properties of light in a periodic pattern such as the direction of optical axis, optical path length, and the like. The structure can be periodic in one dimension such as one-dimensional (1D) grating and/or be periodic in two dimensions such as two-dimensional (2D) grating, While the waveguide plate 130 is depicted as having a planar configuration, other shapes may also be utilized including, for example, curved or partially spherical shapes, in which case the gratings disposed thereon are non-co-planar.

Figure 3:
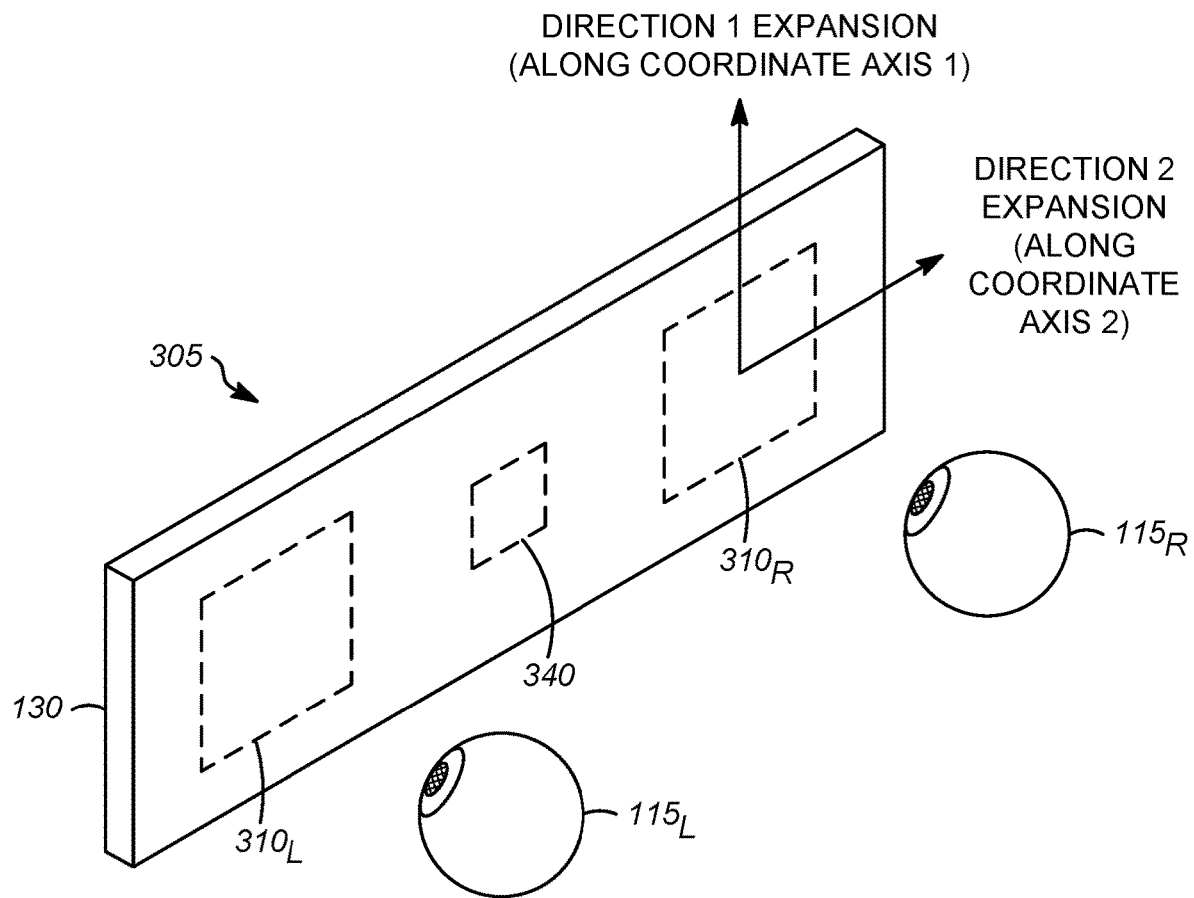
FIG. 3 shows a view of an illustrative exit pupil expander (EPE) in which the exit pupil is expanded along two directions.

While the illustrative EPE 305 shown in FIG. 3 employs a single waveguide plate for binocular operation, in other examples a separate waveguide plate may be used for each eye. In this case each waveguide plate may have its own coupling gratings, imager and display engine.

Figure 4:
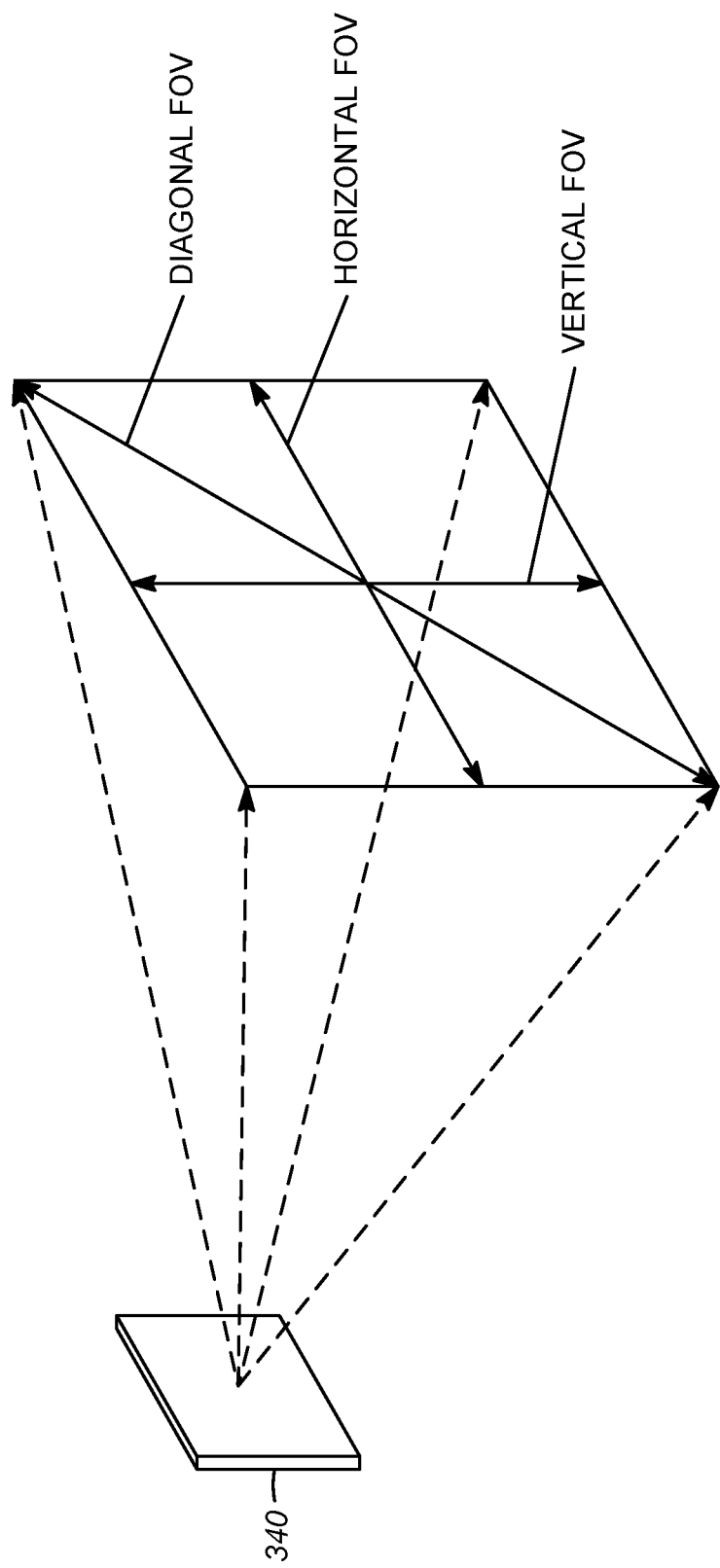
FIG. 4 shows an illustrative input to an exit pupil expander in which the FOV is described by angles in horizontal, vertical, or diagonal orientations.

As shown in FIG. 3, the EPE 305 may be configured to provide an expanded exit pupil in two directions (i.e., along each of a first and second coordinate axis). As shown, the exit pupil is expanded in both the vertical and horizontal directions. It may be understood that the terms "left," "right," "up," "down," "direction," "horizontal," and "vertical" are used primarily to establish relative orientations in the illustrative examples shown and described herein for ease of description. These terms may be intuitive for a usage scenario in which the user of the near-eye optical display device is upright and forward facing, but less intuitive for other usage scenarios. The listed terms are not to be construed to limit the scope of the configurations (and usage scenarios therein) of near-eye optical display features utilized in the present arrangement. The entrance pupil to the EPE 305 at the in-coupling grating 340 is generally described in terms of field of view (FOV), for example, using horizontal FOV, vertical FOV, or diagonal FOV as shown in FIG. 4.

Figure 5:
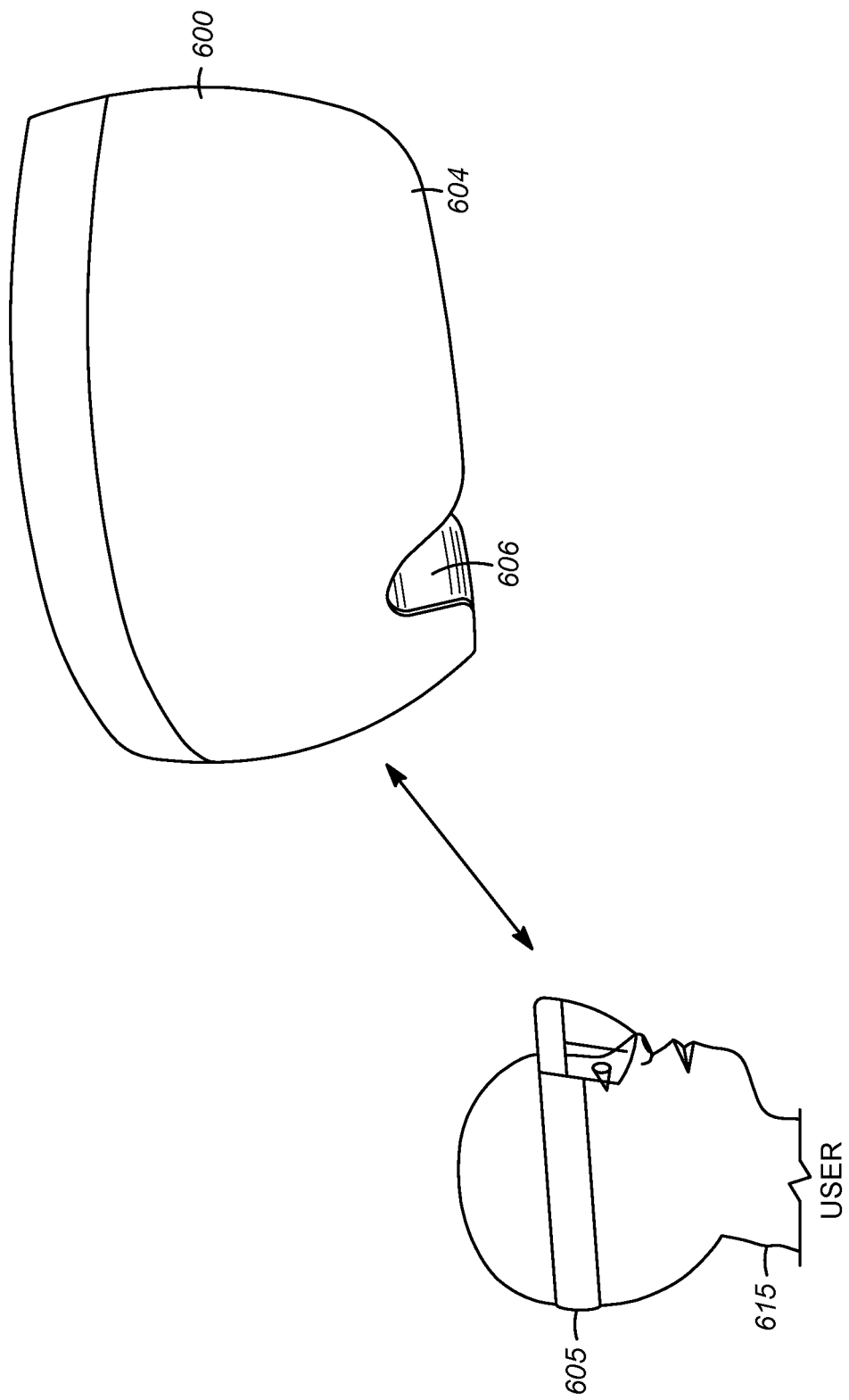
FIG. 5 shows a pictorial front view of a sealed visor that may be used as a component of a head mounted display (HMD) device.

FIG. 5 shows an illustrative example of a visor 600 that incorporates an internal near-eye optical display system that is used in a head mounted display (HMD) device 605 application worn by a user 615. The visor 600, in this example, is sealed to protect the internal near-eye optical display system. The visor 600 typically interfaces with other components of the HMD device 605 such as head mounting/retention systems and other subsystems including sensors, power management, controllers, etc., as illustratively described in conjunction with FIGS. 14 and 15. Suitable interface elements (not shown) including snaps, bosses, screws and other fasteners, etc. may also be incorporated into the visor 600.

The visor 600 includes see-through front and rear shields, 604 and 606 respectively, that can be molded using transparent materials to facilitate unobstructed vision to the optical displays and the surrounding real world environment. Treatments may be applied to the front and rear shields such as tinting, mirroring, anti-reflective, anti-fog, and other coatings, and various colors and finishes may also be utilized. The front and rear shields are affixed to a chassis 705 shown in the disassembled view in FIG. 6.

The sealed visor 600 can physically protect sensitive internal components, including a near-eye optical display system 702 (shown in FIG. 6), when the HIVID device is used in operation and during normal handling for cleaning and the like. The near-eye optical display system 702 includes left and right waveguide displays 710 and 715 that respectively provide virtual world images to the user's left and right eyes for mixed- and/or virtual-reality applications. The visor 600 can also protect the near-eye optical display system 702 from environmental elements and damage should the HMD device be dropped or bumped, impacted, etc.

Figure 6:
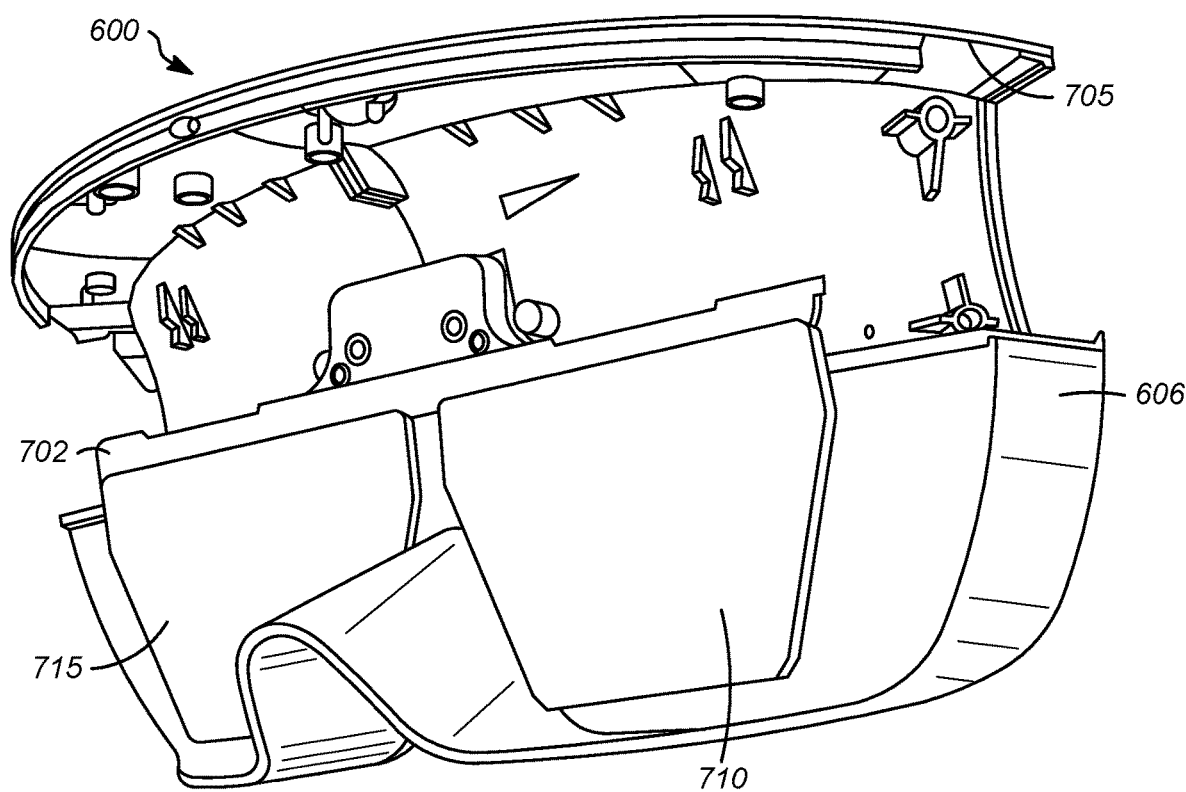
FIG. 6 shows a partially disassembled view of the sealed visor.

As shown in FIG. 6, the rear shield 606 is configured in an ergonomically suitable form to interface with the user's nose, and nose pads and/or other comfort features can be included (e.g., molded-in and/or added-on as discrete components). The sealed visor 600 can also incorporate some level of optical diopter curvature (i.e., eye prescription) within the molded shields in some cases.

Figure 7:
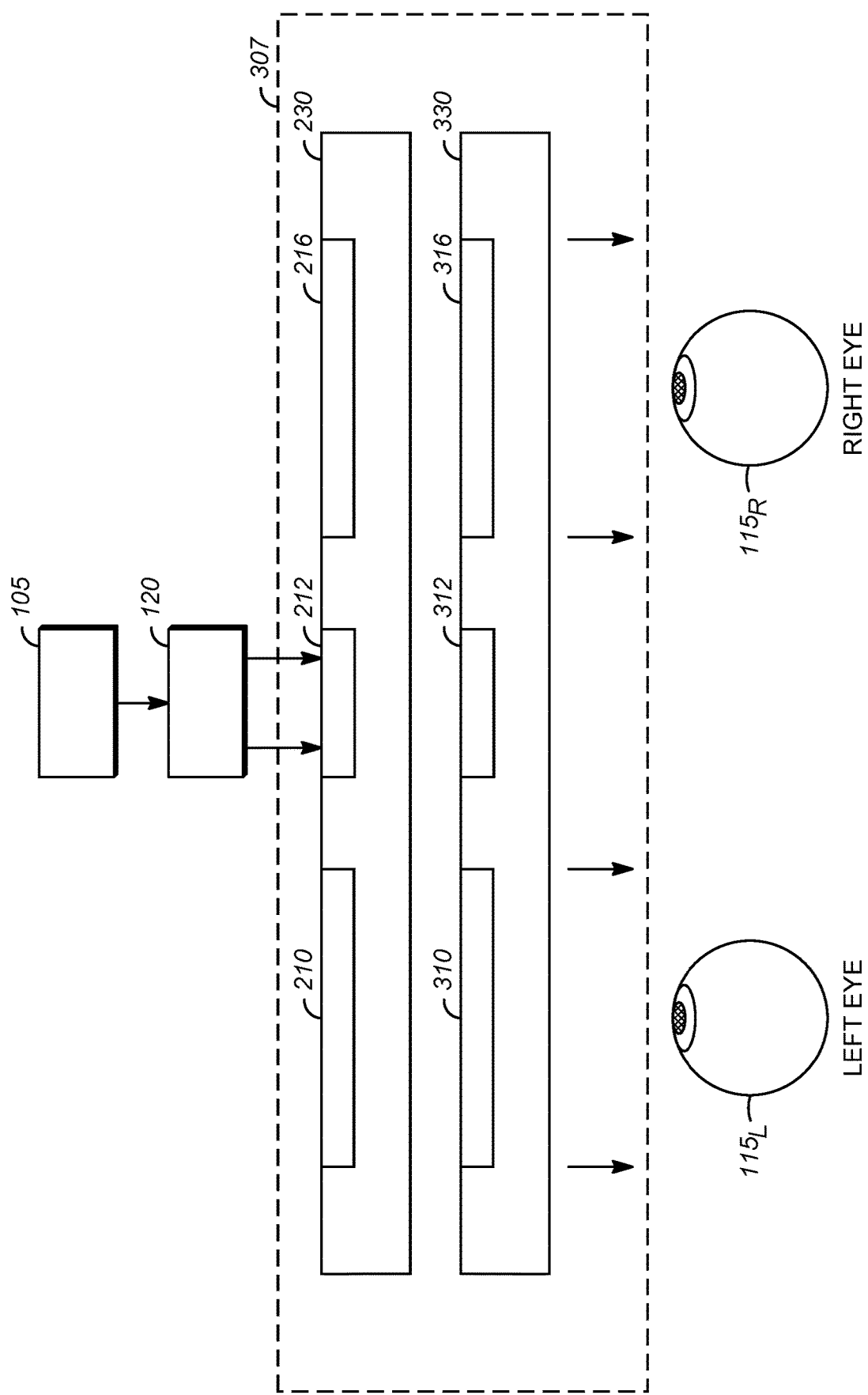
FIG. 7 shows an alternative example of an EPE in which a stack of two or more waveguide plates are employed.

FIG. 7 shows an alternative example of an EPE 307 in which a waveguide display includes a stack of two or more waveguide plates are employed instead of the single waveguide plate shown in the EPE 305 of FIG. 3. In this example each waveguide plate, which each may be of the type described above in connection with FIG. 3, can be used to transfer different optical wavelengths or colors of an image. For instance, in the particular example of FIG. 7, waveguide plate 230 may be used to transmit wavelengths corresponding to the red portion of an image and waveguide plate 330 may be used to transmit wavelengths corresponding to the blue and green portions of the image. The use of a waveguide stack instead of a single waveguide plate addresses the problem that may arise because the optical path lengths within the waveguide plates differ for different wavelengths of light, which can adversely impact the uniform distribution of light. In accordance with an embodiment, the red wavelength range is from 600 nm to 650 nm, the green wavelength range is from 500 nm to 550 nm, and the blue wavelength range is from 430 nm to 480 nm. Other wavelength ranges are also possible.

More specifically, an input coupler 212 of the waveguide 230 can be configured to couple light (corresponding to the image) within the red wavelength range into the waveguide 230, and the output couplers 210 and 216 of the waveguide 230 can be configured to couple light (corresponding to the image) within the red wavelength range (which has travelled from the input coupler 212 to the output couplers 210 and 216 by way of TIR) out of the waveguide 230. Similarly, an input coupler 312 of the waveguide 330 can be configured to couple light (corresponding to the image) within the blue and green wavelength ranges into the waveguide 330, and the output couplers 310 and 316 of the waveguide 330 can be configured to couple light (corresponding to the image) within the blue and green wavelength ranges (which has travelled from the input coupler 312 to the output couplers 310 and 316 by way of TIR) out of the waveguide 330.

FIG. 7 also shows left and right eyes 115L and 115R. The left eye 115L is viewing the image (as a virtual image) that is proximate to the output couplers 210 and 310 and the right eye 155R is viewing the image (as a virtual image) that is proximate to the output couplers 230 and 330. Explained another way, the eyes 115L and 115R are viewing the image from an exit pupil associated with the waveguides 230 and 330.

The distance between adjacent waveguides 230 and 330 can be, e.g., between approximately 50 micrometers and 300 micrometers, but is not limited thereto. While not specifically shown, spacers can be located between adjacent waveguides to maintain a desired spacing therebetween.

In other examples of the EPE, the number of waveguide plates in the stack of waveguide plates may vary, with each waveguide plate transmitting a different range of wavelengths or colors. For instance, if three waveguide plates are employed, one may be configured to transmit wavelengths corresponding to red light, another may be configured to transmit wavelengths corresponding to green light and the third waveguide plate may be configured to transmit wavelengths corresponding to blue light. Of course, other combinations of waveguide plates and wavelengths or colors of light may also be employed. Additionally, the wavelength ranges transmitted by each waveguide plate may be different and nonoverlapping from every other plate (as in the examples mentioned above), or, alternatively, the waveguide ranges may overlap for two or more of the waveguide plates. Moreover, the order in which the waveguide plates are stacked may differ in different examples.

As previously mentioned, the input and output couplers can each be implemented as a diffraction grating, or more generally, as a diffractive optical element (DOE). A diffraction grating is an optical component that may contain a periodic structure that causes incident light to split and change direction due to an optical phenomenon known as diffraction. The splitting (known as optical orders) and angle change depend on the characteristics of the diffraction grating. When the periodic structure is on the surface of an optical component, it is referred to a surface grating. When the periodic structure is due to varying of the surface itself, it is referred to as a surface relief grating (SRG). For example, an SRG can include uniform straight grooves in a surface of an optical component that are separated by uniform straight groove spacing regions. Groove spacing regions can be referred to as "lines", "grating lines" or "filling regions". A DOE having uniform straight grooves is an example of a one-dimensional (1D) ruled grating. The DOE is not limited to 1D ruled gratings. The DOE could include a two-dimensional (2D) grating. For example, the DOE could include a 2D crossed grating. A crossed grating may also be referred to as a doubly periodic grating. Examples of doubly periodic DOEs include, but are not limited to, a 2D arrays of holes, and a 2D array of pillars. The two periods of a doubly periodic DOE do not have to be perpendicular to each other. The nature of the diffraction by an SRG depends on the wavelength, polarization and angle of light incident on the SRG and various optical characteristics of the SRG, such as refractive index, line spacing, groove depth, groove profile, groove fill ratio and groove slant angle. An SRG can be fabricated by way of a suitable microfabrication process, which may involve etching of and/or deposition on a substrate to fabricate a desired periodic microstructure on the substrate to form an optical component, which may then be used as a production master such as a mold or mask for manufacturing further optical components. An SRG is an example of a Diffractive Optical Element (DOE). When a DOE is present on a surface (e.g., when the DOE is an SRG), the portion of that surface spanned by that DOE can be referred to as a DOE area.

A diffraction grating, instead of being a surface grating, can alternatively be a volume grating, such as a Bragg diffraction grating. It is also possible that one or more of the couplers are manufactured as SRGs and then covered within another material, e.g., using an atomic layer deposition process or an aluminum deposition process, thereby essentially burying the SRGs such that the major planar waveguide surface(s) including the SRG(s) is/are substantially smooth. Such a coupler is one example of a hybrid of a surface and volume diffraction grating. Any one of the input and output coupler can be, e.g., a surface diffraction grating, or a volume diffraction grating, or a hybrid of a surface and volume diffraction grating. In some embodiments any one of the input and output couplers can be a polarization grating. In accordance with some embodiments described herein, each diffraction grating can have a preferential linear polarization orientation specified by a direction of the grating lines of the diffraction grating, wherein the coupling efficiency for light having the preferential linear polarization orientation will be higher than for light having a non-preferential linear polarization orientation.

Figure 8:
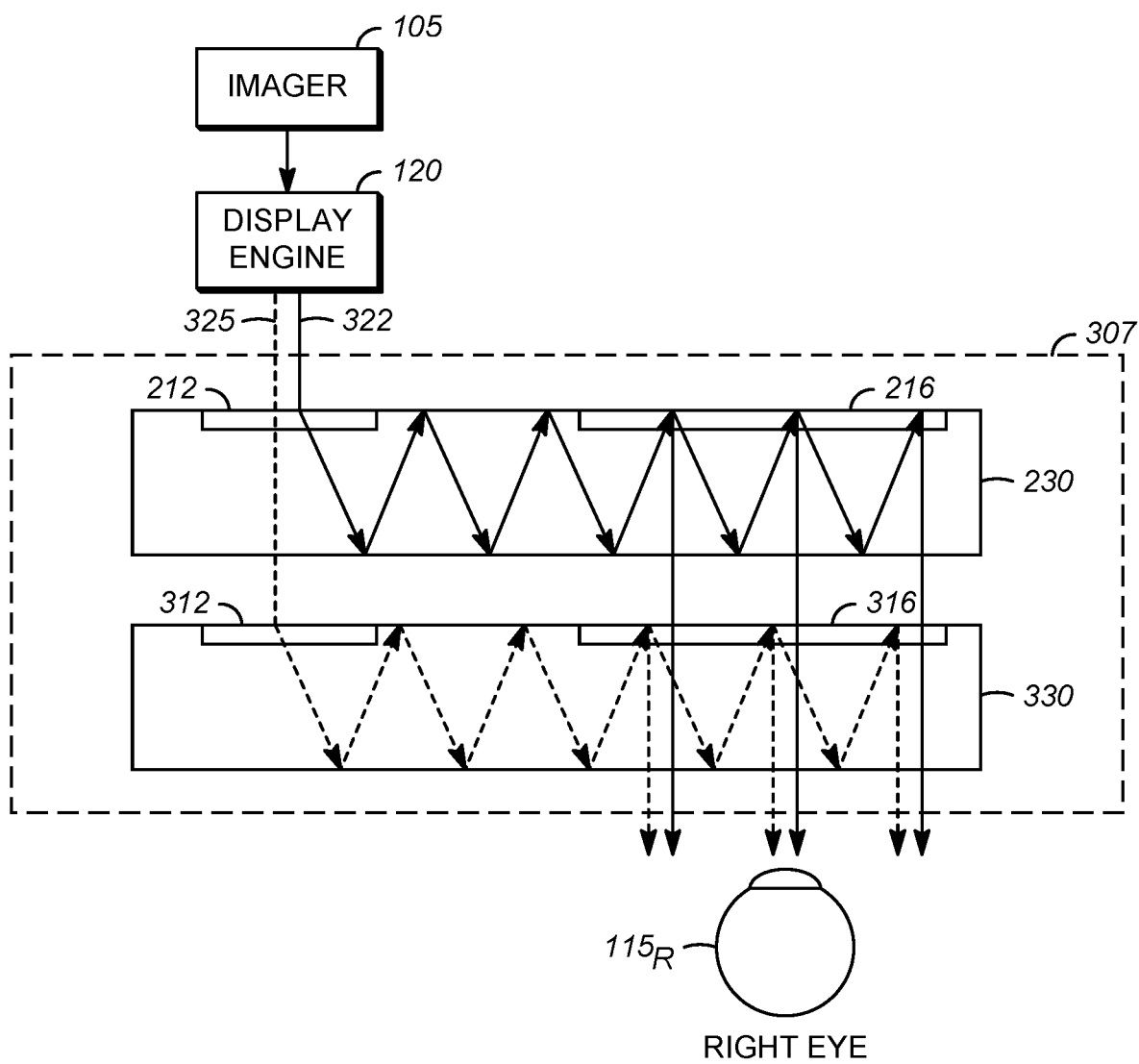
FIG. 8 illustrates the operation of the EPE shown in FIG. 7.

FIG. 8 illustrates the operation of the EPE 307 shown in FIG. 7. For clarity of illustration, only the rightmost portion of the waveguides 230 and 330 are shown, which direct light to the right eye 115R. The leftmost portion of the EPE operates in a similar fashion. In FIG. 8, the solid arrowed line 322 is representative of red and green light of the image that is output by the display engine 120 and the dashed arrowed line 325 is representative of blue and green light of the image that is output by the light engine 120.

When implemented as an input diffraction grating, the input coupler 212 is designed to diffract e.g., red, light within an input angular range (e.g., +/−15 degrees relative to the normal) into the waveguide plate 230, such that an angle of the diffractively in-coupled light exceeds the critical angle for the waveguide 230 and can thereby travel by way of TIR from the input coupler 212 to the output coupler 216. Further, the input coupler 212 is designed to transmit light outside the wavelength range that is diffracted so that light outside this wavelength range will pass through the waveguide plate 230. However, note that for the waveguide plates in the waveguide stack of FIG. 8 there may be some amount of cross-coupling between the waveguides. Likewise, output coupler 216 outputs e.g., red light for viewing by the eye 115R.

Similarly, when implemented as an input diffraction grating, the input coupler 312 is designed to diffract e.g., blue and green light within an input angular range (e.g., +/−15 degrees relative to the normal) into the waveguide plate 330, such that an angle of the diffractively in-coupled blue and green light exceeds the critical angle for the waveguide plate 330 and can thereby travel by way of TIR from the input coupler 312 to the output coupler 316. Further, the input coupler 312 is designed to transmit light outside the e.g., blue and green wavelength ranges, so that light outside the blue and green wavelength ranges will pass through the waveguide plate 330. Likewise, output coupler 316 outputs blue and green light for viewing by the eye 214.

More generally, each of the waveguide plates can include an input coupler that is configured to couple-in light within an input angular range (e.g., +/−15 degrees relative to the normal) and within a specific wavelength range into the waveguide plate, such that an angle of the in-coupled light exceeds the critical angle for the waveguide plate and can thereby travel by way of TIR from the input coupler to the output coupler of the waveguide, and such that light outside the specific wavelength range is transmitted and passes through the waveguide plate.

Because near eye display systems are generally designed to be compact with small, energy efficient imagers and display engines, it is generally important to ensure that the light coupled into the waveguide plates is coupled with high efficiency. To accomplish this, a reflector is sometimes behind the input couplers of the waveguide stack so that light from the display engine passes through the stack twice, thereby increasing the amount of light that is coupled into the waveguide plates.

To further increase the amount of light that is coupled into the waveguide plates, an optical arrangement may be provided, which in one embodiment, causes the main incoming light beam from the display engine to pass through the waveguide stack up to four times, doubling the number of times the light can traverse the waveguide stack in comparison to an arrangement that simply uses a mirror located behind the input couplers of the waveguide stack.

Figure 9:
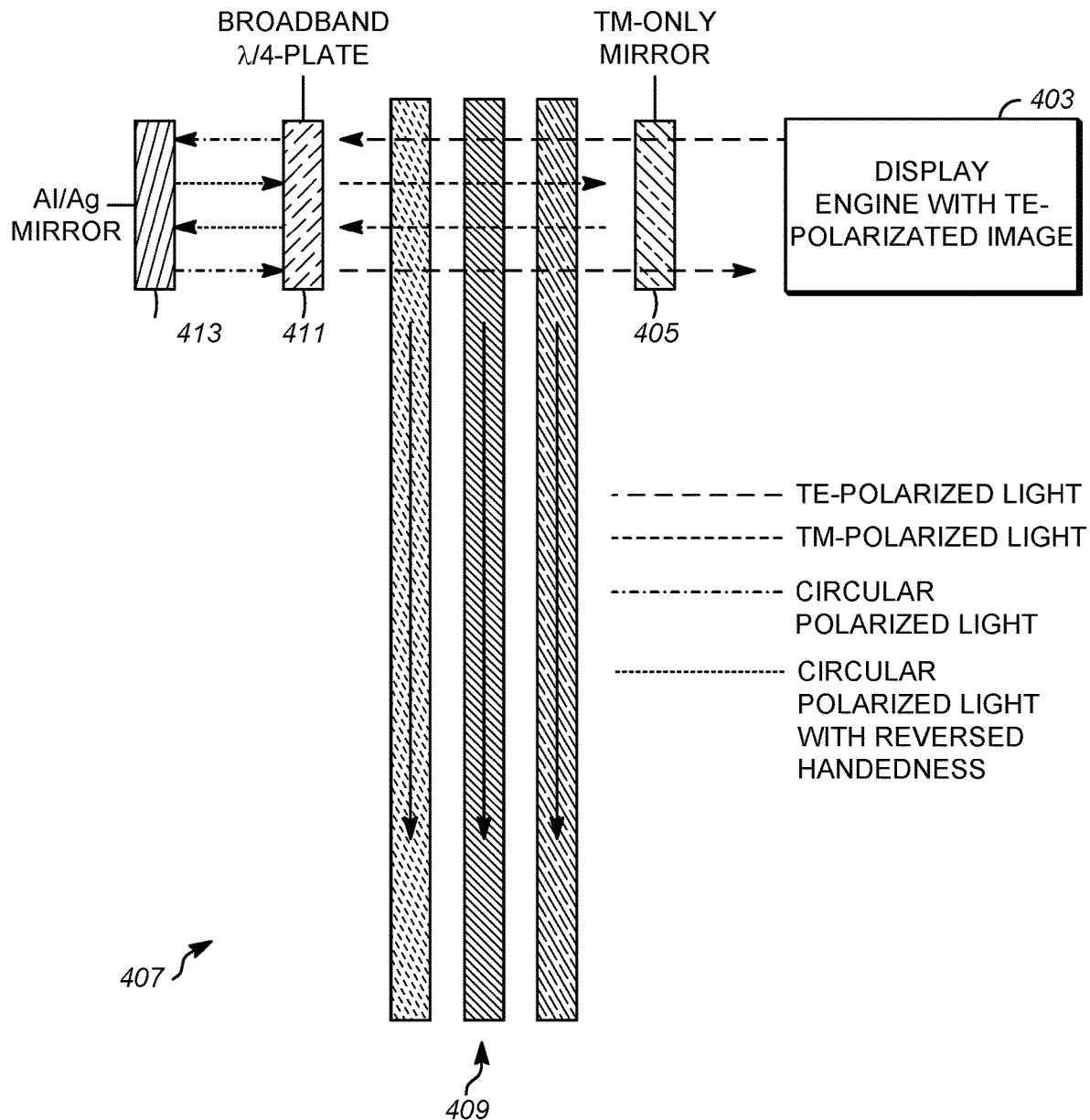
FIG. 9 shows one example of an EPE in which the waveguide display includes a stack of two or more waveguide plates as described above in which some of the light in the main beam from a display engine is able to traverse the waveguide stack up to four times.

FIG. 9 shows one example of an EPE 407 in which the waveguide display includes a stack 409 of two or more waveguide plates as described above in which the main incoming light beam from a display engine 403 is able to traverse the waveguide stack multiple times (e.g., up to four times in some embodiments). The light from the display engine 403 is assumed to be in a first polarization state, which for purposes of illustration is assumed to be a linearly polarized state (i.e., a TE polarization state) in this example.

While in some embodiments the light from the display engine may be unpolarized, such embodiments will not be energy efficient since a portion of the light will be lost and not be coupled into the waveguide plates, potentially causing more optical loss than would be gained by having the light traverse the waveguide stack four times.

As shown, light from the display engine 403 is directed to a birefringent reflective polarizer 405 that transmits TE polarized light (long dashed lines) and reflects the orthogonal polarization state (i.e., TM polarized light (short dashed lines)) to the waveguide stack 409. Accordingly, the TE polarized light passes through the birefringent reflective polarizer 405 and is directed to the input couplers of the waveguide stack. For clarity, the input couplers (as well as the output couplers) are not shown in FIG. 9. The TE-polarized light passes through the waveguide stack 409 and the image is coupled into the waveguides for the first time. After exiting the waveguide stack 409 the light is received by an achromatic wide-angle quarter-wave plate 411 at a 45° orientation (referred to hereinafter as quarter-wave plate 411) that is located behind the waveguide stack 409 (i.e., on the side of waveguide stack 409 opposite to the display engine 403). As those of ordinary skill in the art will recognize, the quarter-wave plate 411 converts linearly polarized light (TE polarized light in this particular case) to left-handedly or right-handedly circularly polarized light. The circularly polarized light (dotted-dashed lines) exits the 45° quarter-wave plate 411 and is directed to a mirror 413 such as a metallic mirror employing, for instance, an Al/Ag coating.

Next, the circularly polarized light is reflected from the mirror 413 and in the process reverses its phase. In this way the mirror changes the handedness of the circularly polarized light (i.e., from left-handedly circularly polarized light to right-handedly circularly polarized light or vice versa). The light with the reversed handedness (dotted lines) then passes through the quarter-wave plate 411 a second time and is converted to TM-polarized light. The TM polarized light from the quarter-wave plate 411 is coupled back into the waveguide stack 409 from the backside direction and the image is coupled into the waveguide for a second time. The remaining TM polarized light passes through the waveguide stack 409 for the second time, reflected from the birefringent reflective polarizer 405 and passes through the waveguide stack 409 for a third time.

After traversing the waveguide stack 409 for the third time, the TM-polarized light is converted to circularly polarized light by the quarter-wave plate 411, reflected by the mirror 413, which again reverses the handedness of the circularly polarized light, and is converted to TE-polarized light by the quarter-wave plate 411. The TE polarized light from the quarter-wave plate 411 is coupled back into the waveguide stack 409 from the backside direction and traverses the waveguide stack 409 for the fourth time. Any remaining TE polarized light that is not coupled into the waveguides of the waveguide stack 409 passes through the birefringent reflective polarizer 405 where it goes back toward the display engine 403. In some cases a filter, absorber or like may be provided to prevent the remaining light from reaching the display engine 403 or from being scattered from other components of the system.

While in the example shown in FIG. 9 the light from display engine 403 is linearly polarized in the TE-polarized state, in an alternative embodiment the light may be linearly polarized in the TM-polarized state. In this case the polarized mirror 405 is configured to transmit TM polarized light and reflect TE polarized light. Likewise, in yet other embodiments instead of being in a linearly polarized state, the light from the display engine may be in a circularly polarized state with suitable adjustments to the configuration of the birefringent reflective polarizer 405 and the quarter-wave plate 411. In this case, for instance, it may be advantageous to locate the quarter-wave plate 411 before the birefringent reflective polarizer 405 to convert the light to linear polarization.

In some embodiments instead of employing a single input coupler for each waveguide plate, multiple input couplers may be employed. In this case each individual input coupler can be optimized for the particular wavelengths that are to be in-coupled to the waveguide plates by that input coupler with which they are associated. In this case the sets of mirrors and quarter-wave plates associated with each input coupler can be optimized for those wavelengths. That is, by way of example, an input coupler that is optimized to in-couple red light may be associated with red-optimized quarter-wave plates and mirrors, an input coupler that is optimized to in-couple green light may be associated with green-optimized quarter-wave plates and mirrors, and so on.

In the example shown in FIG. 9 the quarter-wave plate 411 is located at the backend of the waveguide stack 409 so that it receives the light after traversing the waveguide stack. In this way the light in-coupled to the waveguide plates is linearly polarized. In an alternative embodiment, illustrated in FIG. 10 and described below, the quarter-wave plate may be located before the light is received by the waveguide stack 409 so that the light in-coupled to the waveguide plates is circularly polarized. In yet another embodiment, the quarter-wave plate may be located between the waveguide plates.

In one embodiment, the mirror 413 behind the waveguide plates 409 could be replaced or combined with one or more reflective dielectric filters. Alternatively, or additionally, one more reflective dielectric filters may be situated at different positions between the waveguides plates in the waveguide stack. For example, a reflective dielectric filter may be provided behind the waveguide plate that supports blue wavelengths, which reflects blue wavelengths but transmits green and red wavelengths to the green and red supporting waveguide plates behind the blue plate. Similarly, in another embodiment a reflective dielectric filter may be provided behind the waveguide plates that respectively support blue and green wavelengths, which reflects blue and green wavelengths but transmits red wavelengths to the red supporting waveguide plate behind the green and blue supporting waveguide plates. In this latter embodiment a red reflecting dielectric filter or a broadband metallic mirror (e.g., and Ad/Ag mirror) may be located behind the red supporting waveguide plate. In these cases it may be advantageous to locate the quarter-wave plate so that it receives the light before the light enters the waveguide stack.

In some embodiments a Faraday rotator could be used instead of the quarter-wave plate to achieve the polarization conversion. In this case, the linear polarization angle of the light is changed without conversion to circular polarization.

In another embodiment, the waveguide input couplers are configured to alter the polarization state of the light traversing through the waveguide stack and the quarter-wave plate may be replaced with a wave plate component providing not exactly quarter-wave phase difference, but some other optimal phase difference so that the overall in-coupling of light into the waveguide is maximized, taking account the polarization effect of the waveguides.

In yet another embodiment, the waveguide stack could be arranged to replace the function of the quarter-wave plate and provide the same required quarter-wave phase shift at the important wavelengths to reverse the polarization of the light traveling through it back and forth.

In yet another embodiment, the incoming polarization state is selected to be a linear polarization state that is oriented at an optimized angle relative to the gratings of the input couplers and the reflective polarizer angle is selected accordingly so that the selected polarization angle is fully transmitted and the linear polarization state at 90 degrees angle to that polarization angle is fully reflected. In this case, the angle of wave plate can be optimized according to the polarization state of the in-coupled light.

Figure 10:
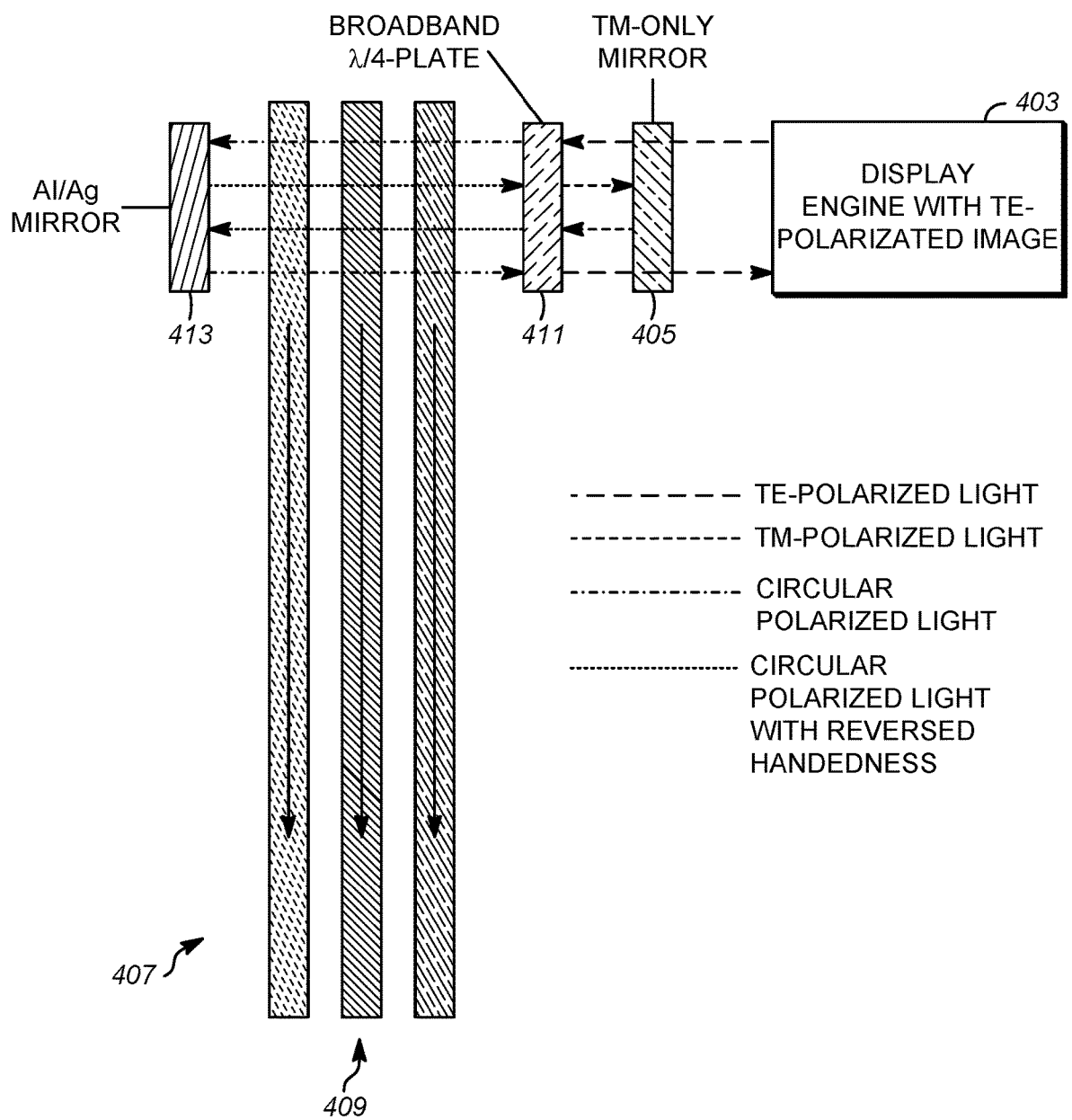
FIG. 10 shows another example of an EPE in which the waveguide display includes a stack of two or more waveguide plates as described above in which some of the light in the main beam from a display engine is able to traverse the waveguide stack up to four times.

FIG. 10 shows an embodiment of the EPE 407 in which the quarter-wave plate may be located before the light is received by the waveguide stack so that the light in-coupled to the waveguide plates is circularly polarized. Similar to the embodiment of FIG. 9, the light from the display engine 403 is assumed to be in a first polarization state, which for purposes of illustration is assumed to be a linearly polarized state (i.e., a TE polarization state) in this example. As shown, light from the display engine 403 is directed to the birefringent reflective polarizer 405, which transmits TE polarized light (long dashed lines) and reflects the orthogonal polarization state (i.e., TM polarized light (short dashed lines) to the quarter-wave plate 411. The quarter-wave plate 411 converts the TE-polarized light to left-handedly or right-handedly circularly polarized light. The light passes through the waveguide stack 409 and the image is coupled in for the first time. The circularly polarized light is reflected from the mirror 413 behind the waveguide stack 409 and its handedness is reversed. The light is then coupled into the waveguide stack 409 from the backside direction and passes through the waveguide stack 409 a second time, with some of it being in-coupled to the waveguide plates. Any remaining light, which is circularly polarized with reversed handedness, passes through the quarter-wave plate 411, which converts it to TM polarized light and directs it to the birefringent reflective polarizer 405. The TM-polarized light is reflected from the birefringent reflective polarizer 405 and passes through the quarter-wave plate 411 again, which converts it to circularly polarized light with the reversed handedness and directs it into the waveguide stack 409 for a third time. Any light that traverses the waveguide stack 409 for the third time is reflected back into the waveguide stack 409 by the mirror 413 with its handedness reversed so that the light has its original handedness. The light then passes into the waveguide stack 409 for a fourth time and any light that traverses the waveguide stack 409 without being in-coupled to one of the waveguide plates is converted back to TE polarized light by the quarter-wave plate 411. Any remaining light passes through the birefringent reflective polarizer 405 and is directed toward the display engine 403. As discussed in connection with the embodiment of FIG. 9, a filter, absorber or the like may be provided to prevent the light from reaching the display engine 403 or from being scattered from other components of the system.

It should be noted that while the embodiments shown in FIGS. 9 and 10 show a waveguide stack with two or more waveguide plates, in some alternative embodiments only a single waveguide plate may be employed.

Figure 11:
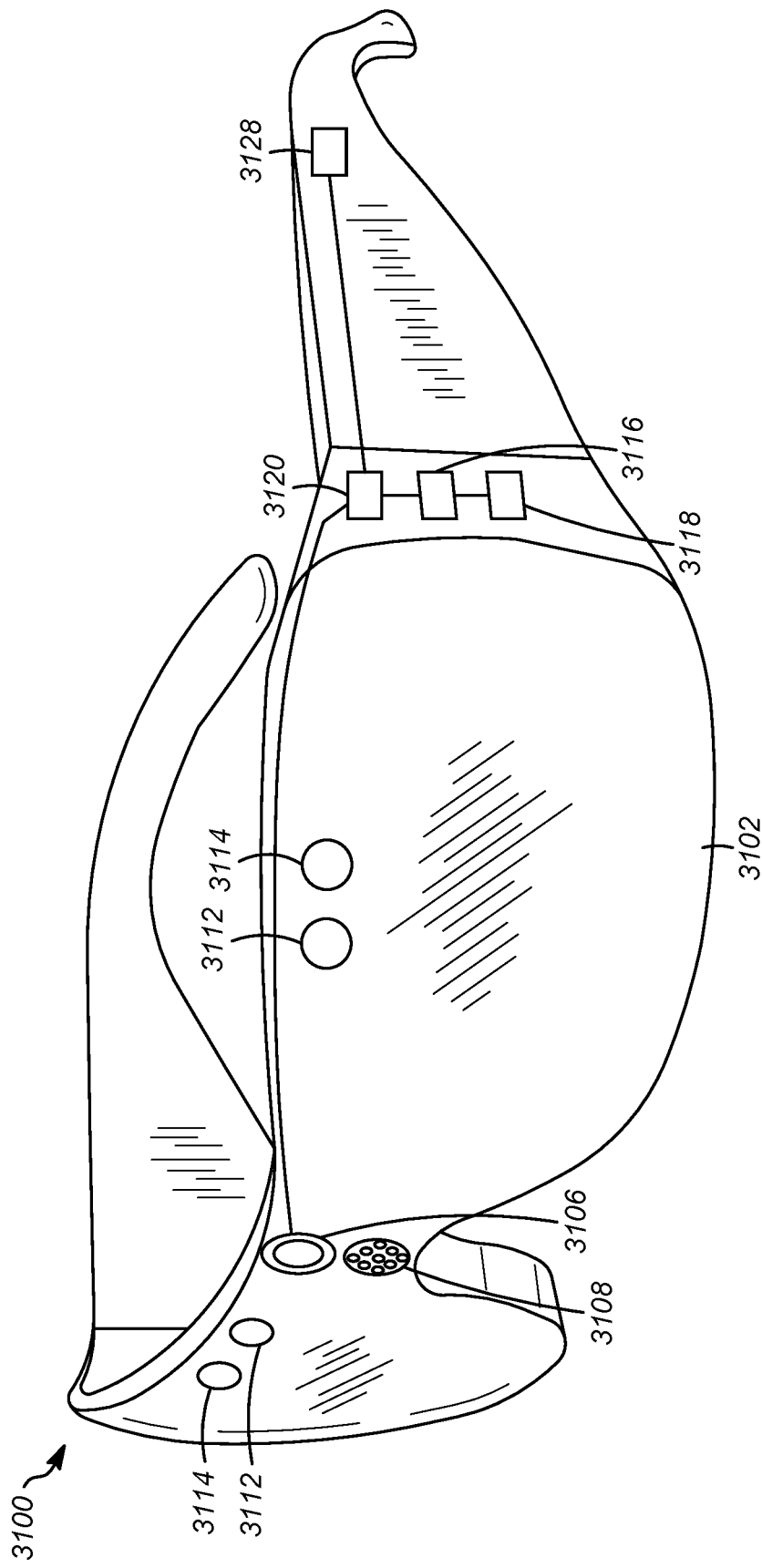
FIG. 11 shows an illustrative example of a mixed-reality or virtual-reality HMD device.
Figure 12:
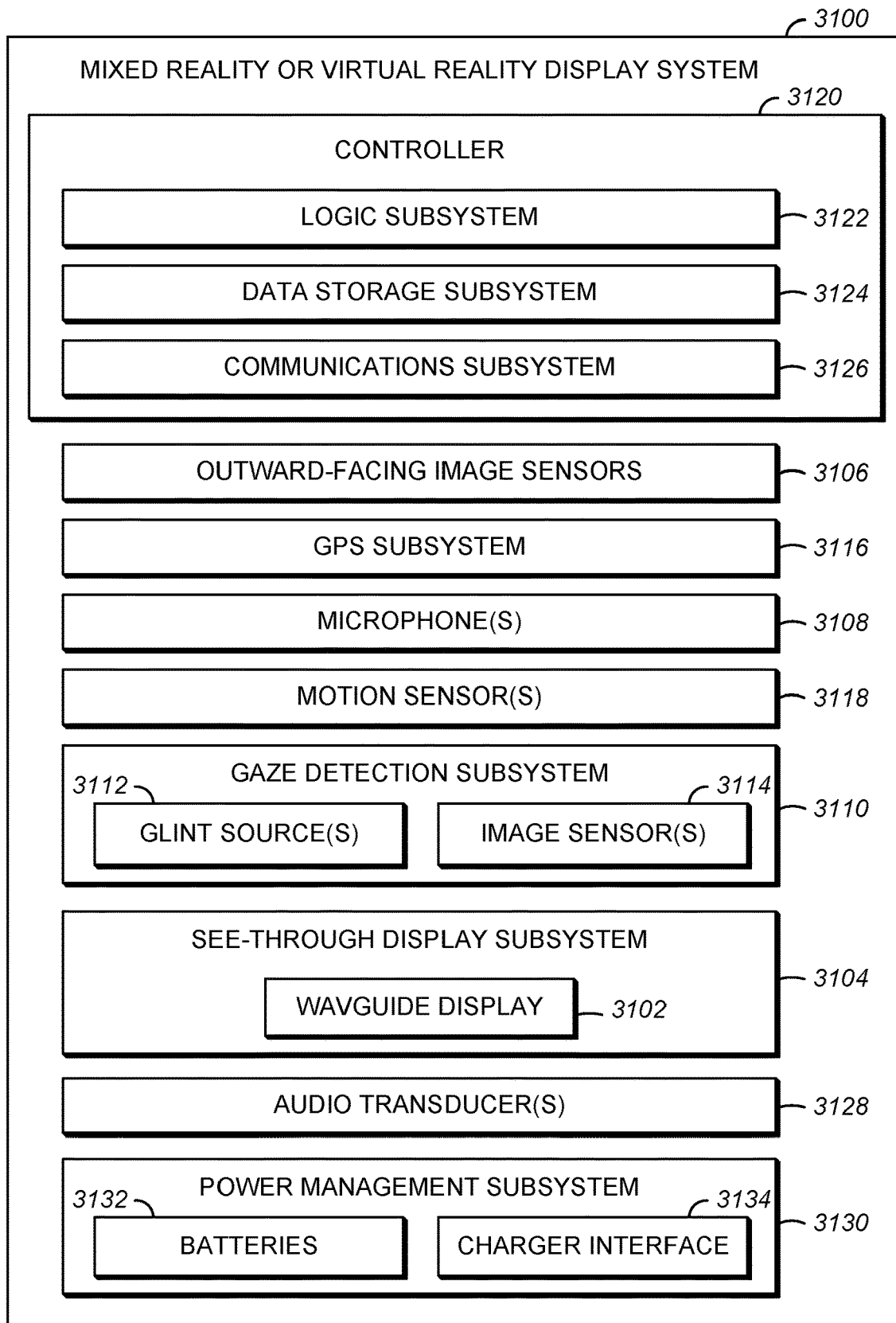
FIG. 12 shows a functional block diagram of the mixed-reality or virtual-reality HMD device shown in FIG. 11.

Embodiments of the waveguide display described above may be utilized in mixed-reality or virtual-reality applications. FIG. 11 shows one particular illustrative example of a mixed-reality or virtual-reality HMD device 3100, and FIG. 12 shows a functional block diagram of the device 3100. HMD device 3100 comprises one or more waveguide displays 3102 that form a part of a see-through display subsystem 3104, so that images may be displayed. HMD device 3100 further comprises one or more outward-facing image sensors 3106 configured to acquire images of a background scene and/or physical environment being viewed by a user, and may include one or more microphones 3108 configured to detect sounds, such as voice commands from a user. Outward-facing image sensors 3106 may include one or more depth sensors and/or one or more two-dimensional image sensors. In alternative arrangements, as noted above, a mixed reality or virtual reality display system, instead of incorporating a see-through display subsystem, may display mixed reality or virtual reality images through a viewfinder mode for an outward-facing image sensor.

The HMD device 3100 may further include a gaze detection subsystem 3110 configured for detecting a direction of gaze of each eye of a user or a direction or location of focus, as described above. Gaze detection subsystem 3110 may be configured to determine gaze directions of each of a user's eyes in any suitable manner. For example, in the illustrative example shown, a gaze detection subsystem 3110 includes one or more glint sources 3112, such as infrared light sources, that are configured to cause a glint of light to reflect from each eye of a user, and one or more image sensors 3114, such as inward-facing sensors, that are configured to capture an image of each eyeball of the user. Changes in the glints from the user's eye and/or a location of a user's pupil, as determined from image data gathered using the image sensor(s) 3114, may be used to determine a direction of gaze.

In addition, a location at which gaze lines projected from the user's eyes intersect the external display may be used to determine an object at which the user is gazing (e.g. a displayed virtual object and/or real background object). Gaze detection subsystem 3110 may have any suitable number and arrangement of light sources and image sensors. In some implementations, the gaze detection subsystem 3110 may be omitted.

The HMD device 3100 may also include additional sensors. For example, HMD device 3100 may comprise a global positioning system (GPS) subsystem 3116 to allow a location of the HMD device 3100 to be determined. This may help to identify real-world objects, such as buildings, etc. that may be located in the user's adjoining physical environment.

The HMD device 3100 may further include one or more motion sensors 3118 (e.g., inertial, multi-axis gyroscopic, or acceleration sensors) to detect movement and position/orientation/pose of a user's head when the user is wearing the system as part of a mixed reality or virtual reality HMD device. Motion data may be used, potentially along with eye-tracking glint data and outward-facing image data, for gaze detection, as well as for image stabilization to help correct for blur in images from the outward-facing image sensor(s) 3106. The use of motion data may allow changes in gaze direction to be tracked even if image data from outward-facing image sensor(s) 3106 cannot be resolved.

In addition, motion sensors 3118, as well as microphone(s) 3108 and gaze detection subsystem 3110, also may be employed as user input devices, such that a user may interact with the HMD device 3100 via gestures of the eye, neck and/or head, as well as via verbal commands in some cases. It may be understood that sensors illustrated in FIGS. 31 and 32 and described in the accompanying text are included for the purpose of example and are not intended to be limiting in any manner, as any other suitable sensors and/or combination of sensors may be utilized to meet the needs of a particular implementation. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The HMD device 3100 can further include a controller 3120 such as one or more processors having a logic subsystem 3122 and a data storage subsystem 3124 in communication with the sensors, gaze detection subsystem 3110, display subsystem 3104, and/or other components through a communications subsystem 3126. The communications subsystem 3126 can also facilitate the display system being operated in conjunction with remotely located resources, such as processing, storage, power, data, and services. That is, in some implementations, an HMD device can be operated as part of a system that can distribute resources and capabilities among different components and subsystems.

The storage subsystem 3124 may include instructions stored thereon that are executable by logic subsystem 3122, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The HMD device 3100 is configured with one or more audio transducers 3128 (e.g., speakers, earphones, etc.) so that audio can be utilized as part of a mixed reality or virtual reality experience. A power management subsystem 3130 may include one or more batteries 3132 and/or protection circuit modules (PCMs) and an associated charger interface 3134 and/or remote power interface for supplying power to components in the HMD device 3100.

It may be appreciated that the HMD device 3100 is described for the purpose of example, and thus is not meant to be limiting. It may be further understood that the display device may include additional and/or alternative sensors, cameras, microphones, input devices, output devices, etc. than those shown without departing from the scope of the present arrangement. Additionally, the physical configuration of an HMD device and its various sensors and subcomponents may take a variety of different forms without departing from the scope of the present arrangement.

Various exemplary embodiments of the present display system are now presented by way of illustration and not as an exhaustive list of all embodiments. An example includes a waveguide display, comprising: a waveguide stack that includes at least one waveguide substrate; an input coupler for coupling light into the waveguide substrate, the input coupler being configured to in-couple a first range of wavelengths into the waveguide substrate; and an optical arrangement that includes a birefringent reflective polarizer, a mirror and a polarization state converting element configured to convert light in a linear polarization state to a circular polarization state and to convert light in a circular polarization state to a linear polarization state, the mirror being arranged to receive light from the polarization state converting element and reflect the light back to the polarization state converting element, the optical arrangement causing a transmission path of light that traverses the waveguide stack a first time to be folded back through the waveguide stack such that at least a portion of light not coupled into the at one waveguide substrate is caused to traverse the waveguide stack a plurality of additional times.

In another example the birefringent reflective polarizer is located to direct the light into the waveguide stack so that the light that traverses the waveguide stack the first time is linearly polarized or circularly polarized. In another example the polarization state converting element is an achromatic wide-angle quarter-wave plate at a 45° orientation. In another example the polarization state converting element is a Faraday rotator located to receive light after traversing the waveguide stack the first time. In another example the optical arrangement is configured so that the polarization state converting element receives linearly polarized light and causes linearly polarized light to be in-coupled to the at least one waveguide substrate. In another example the polarization state converting element is located to receive light after the light traverses the waveguide stack the first time. In another example the optical arrangement is configured so that the polarization state converting element receives linearly polarized light and causes circularly polarized light to be in-coupled to the at least one waveguide substrate. In another example the polarization state converting element is located to receive the light before the light traverses the waveguide stack the first time. In another example the at least one waveguide substrate includes at least first and second waveguide substrates and the input coupler includes first and second input couplers for coupling light into the first and second waveguide substrates, respectively, the first input coupler being configured to in-couple a first range of wavelengths into the first waveguide substrate and transmit other wavelengths and the second input coupler being configured to in-couple a second range of wavelengths into the second waveguide substrate and transmit other wavelengths, and further comprising at least first and second output couplers for coupling light out of the first and second waveguide substrates, respectively, the first output coupler being configured to out-couple the first range of wavelengths from the first waveguide substrate and the second output coupler being configured to out-couple the second range of wavelengths from the second waveguide substrate. In another example the first input coupler further comprises a plurality of first input couplers for coupling light in the first waveguide substrate and the second input coupler further comprises a plurality of second input couplers for coupling light in the second waveguide substrate, and wherein the optical arrangement further comprises a plurality of optical arrangements, each of the optical arrangements being associated with one of the plurality of first input couplers or one of the plurality of second input couplers and being tailored for operation at wavelengths to be in-coupled by the input coupler with which it is respectively associated. In another example the optical arrangement includes a dielectric filter disposed along the transmission path of the light for reflecting light of selected wavelengths back to one or more of the at least first and second waveguide plates that in-couple light of the selected wavelengths and to transmit therethrough wavelengths other than the selected wavelengths.

A further example includes a see-through, near eye display system, comprising: an imager for providing an output image; an exit pupil expander (EPE); a display engine for coupling the output image in a first polarization state from the imager into the EPE, the EPE including: a waveguide stack that includes at least first and second waveguide plates, each of the waveguide plates including a substrate having an input coupling diffractive optical element (DOE) for in-coupling image light of a range of wavelengths to the substrate and transmitting other wavelengths of image light and at least one output coupling DOE for out-coupling image light of the range of wavelengths from the substrate, the range of wavelengths of the image light for each of the waveguide plates differing at least in part from each of the other waveguide plates; a birefringent reflective polarizer configured to reflect light in a second polarization state orthogonal to the first polarization state and transmit therethrough to the waveguide stack light in the first polarization state; a polarization state converting element configured to receive light in the first polarization state after traversing the waveguide stack and convert the light in the first polarization state to circularly polarized light; and a reflector for receiving the circularly polarized light and reflecting the circularly polarized light back to the polarization state converting element to thereby convert the reflected circularly polarized light to reflected light in the second linear polarization state, the reflected light in the second linear polarization state being directed from the polarization state converting element back to the waveguide stack such that the reflected light in the second linear polarization state traversing the waveguide stack is reflected back to the waveguide stack by the birefringent reflective polarizer.

In another example the polarization state converting element is a 45° quarter-wave plate. In another example the first linearly polarized state is a TE or TM polarization state. In another example a dielectric filter is disposed along an optical path traversed by the light to reflect light of selected wavelengths back to one or more of the at least first and second waveguide plates that in-couple light of the selected wavelengths and to transmit therethrough wavelengths other than the selected wavelengths. A further example includes a head mounted display comprising: a head mounted retention system for wearing on a head of a user; a visor assembly secured to the head mounted retention system, the visor assembly including; a chassis; a near-eye optical display system secured to the chassis that includes a waveguide display, the waveguide display including: a waveguide stack that includes at least one waveguide substrate; an input coupler for coupling light into the waveguide substrate, the input coupler being configured to in-couple a first range of wavelengths into the waveguide substrate; and an optical arrangement that includes a birefringent reflective polarizer, a mirror and a polarization state converting element configured to convert light in a linear polarization state to a circular polarization state and to convert light in a circular polarization state to a linear polarization state, the mirror being arranged to receive light from the polarization state converting element and reflect the light back to the polarization state converting element, the optical arrangement causing a transmission path of light that traverses the waveguide stack a first time to be folded back through the waveguide stack such that at least a portion of light not coupled into the at one waveguide substrate is caused to traverse the waveguide stack a plurality of additional times.

In another example the birefringent reflective polarizer is located to direct the light into the waveguide stack so that the light that traverses the waveguide stack the first time is linearly polarized or circularly polarized. In another example the polarization state converting element is an achromatic wide-angle quarter-wave plate at a 45° orientation. In another example the polarization state converting element is a Faraday rotator located to receive light after traversing the waveguide stack the first time. In another example the optical arrangement is configured so that the polarization state converting element receives linearly polarized light and causes linearly polarized light to be in-coupled to the at least one waveguide substrate. In another example the input coupler is configured to alter a polarization state of light being in-coupled, the polarization state converting element being a wave plate configured to provide a phase difference that enhances in-coupling of light into the waveguide plate. In another example the waveguide stack is configured to function as the polarization state converting element in the optical arrangement. In another example an incoming polarization state of light received by the waveguide display is a linear polarization state that is oriented at a selected angle relative to an angle of gratings of the input coupler to enhance in-coupling of light into the waveguide plate, Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A waveguide display, comprising:
    a waveguide stack that includes at least one waveguide substrate;
    an input coupler for coupling light into the waveguide substrate, the input coupler being configured to in-couple a first range of wavelengths into the waveguide substrate; and
    an optical arrangement that includes a birefringent reflective polarizer, a mirror and a polarization state converting element configured to convert light in a linear polarization state to a circular polarization state and to convert light in a circular polarization state to a linear polarization state, the mirror being arranged to receive light from the polarization state converting element and reflect the light back to the polarization state converting element, the optical arrangement causing a transmission path of light that traverses the waveguide stack a first time to be folded back through the waveguide stack such that at least a portion of light not coupled into the at one waveguide substrate is caused to traverse the waveguide stack a plurality of additional times, wherein the polarization state converting element is an achromatic wide-angle quarter-wave plate at a 45° orientation.

2. The waveguide display of claim 1, wherein the birefringent reflective polarizer is located to direct the light into the waveguide stack so that the light that traverses the waveguide stack the first time is linearly polarized or circularly polarized.

3. The waveguide display of claim 1, wherein the polarization state converting element is a Faraday rotator located to receive light after traversing the waveguide stack the first time.

4. The waveguide display of claim 1, wherein the optical arrangement is configured so that the polarization state converting element receives linearly polarized light and causes linearly polarized light to be in-coupled to the at least one waveguide substrate.

5. The waveguide display of claim 4, wherein the polarization state converting element is located to receive light after the light traverses the waveguide stack the first time.

6. The waveguide display of claim 1, wherein the optical arrangement is configured so that the polarization state converting element receives linearly polarized light and causes circularly polarized light to be in-coupled to the at least one waveguide substrate.

7. The waveguide display of claim 6, wherein the polarization state converting element is located to receive the light before the light traverses the waveguide stack the first time.

8. The waveguide display of claim 1, wherein the at least one waveguide substrate includes at least first and second waveguide substrates and the input coupler includes first and second input couplers for coupling light into the first and second waveguide substrates, respectively, the first input coupler being configured to in-couple a first range of wavelengths into the first waveguide substrate and transmit other wavelengths and the second input coupler being configured to in-couple a second range of wavelengths into the second waveguide substrate and transmit other wavelengths, and further comprising at least first and second output couplers for coupling light out of the first and second waveguide substrates, respectively, the first output coupler being configured to out-couple the first range of wavelengths from the first waveguide substrate and the second output coupler being configured to out-couple the second range of wavelengths from the second waveguide substrate.

9. The waveguide display of claim 8, wherein the first input coupler further comprises a plurality of first input couplers for coupling light in the first waveguide substrate and the second input coupler further comprises a plurality of second input couplers for coupling light in the second waveguide substrate, and wherein the optical arrangement further comprises a plurality of optical arrangements, each of the optical arrangements being associated with one of the plurality of first input couplers or one of the plurality of second input couplers and being tailored for operation at wavelengths to be in-coupled by the input coupler with which it is respectively associated.

10. The waveguide display of claim 8, wherein the optical arrangement includes a dielectric filter disposed along the transmission path of the light for reflecting light of selected wavelengths back to one or more of the at least first and second waveguide plates that in-couple light of the selected wavelengths and to transmit therethrough wavelengths other than the selected wavelengths.

11. A see-through, near eye display system, comprising:
    an imager for providing an output image;
    an exit pupil expander (EPE);
    a display engine for coupling the output image in a first polarization state from the imager into the EPE, the EPE including:
    a waveguide stack that includes at least first and second waveguide plates, each of the waveguide plates including a substrate having an input coupling diffractive optical element (DOE) for in-coupling image light of a range of wavelengths to the substrate and transmitting other wavelengths of image light and at least one output coupling DOE for out-coupling image light of the range of wavelengths from the substrate, the range of wavelengths of the image light for each of the waveguide plates differing at least in part from each of the other waveguide plates;
    a birefringent reflective polarizer configured to reflect light in a second polarization state orthogonal to the first polarization state and transmit therethrough to the waveguide stack light in the first polarization state;
    a polarization state converting element configured to receive light in the first polarization state after traversing the waveguide stack and convert the light in the first polarization state to circularly polarized light; and
    a reflector for receiving the circularly polarized light and reflecting the circularly polarized light back to the polarization state converting element to thereby convert the reflected circularly polarized light to reflected light in the second linear polarization state, the reflected light in the second linear polarization state being directed from the polarization state converting element back to the waveguide stack such that the reflected light in the second linear polarization state traversing the waveguide stack is reflected back to the waveguide stack by the birefringent reflective polarizer.

12. The see-through, near eye display system of claim 11, wherein the polarization state converting element is an achromatic wide-angle quarter-wave plate at a 45° orientation.

13. The see-through, near eye display system of claim 11, wherein the first linearly polarized state is a TE or TM polarization state.

14. The see-through, near eye display system of claim 11, further comprising a dielectric filter disposed along an optical path traversed by the light to reflect light of selected wavelengths back to one or more of the at least first and second waveguide plates that in-couple light of the selected wavelengths and to transmit therethrough wavelengths other than the selected wavelengths.

15. A head mounted display comprising:
a head mounted retention system for wearing on a head of a user;
a visor assembly secured to the head mounted retention system, the visor assembly including;
a chassis;
a near-eye optical display system secured to the chassis that includes a waveguide display, the waveguide display including:
a waveguide stack that includes at least one waveguide substrate;
an input coupler for coupling light into the waveguide substrate, the input coupler being configured to in-couple a first range of wavelengths into the waveguide substrate; and
an optical arrangement that includes a birefringent reflective polarizer, a mirror and a polarization state converting element configured to convert light in a linear polarization state to a circular polarization state and to convert light in a circular polarization state to a linear polarization state, the mirror being arranged to receive light from the polarization state converting element and reflect the light back to the polarization state converting element, the optical arrangement causing a transmission path of light that traverses the waveguide stack a first time to be folded back through the waveguide stack such that at least a portion of light not coupled into the at one waveguide substrate is caused to traverse the waveguide stack a plurality of additional times, wherein the input coupler is configured to alter a polarization state of light being in-coupled, the polarization state converting element being a wave plate configured to provide a phase difference that enhances in-coupling of light into the waveguide plate.

16. The head mounted display of claim 15, wherein the birefringent reflective polarizer is located to direct the light into the waveguide stack so that the light that traverses the waveguide stack the first time is linearly polarized or circularly polarized.

17. The head mounted display of claim 15, wherein the waveguide stack is configured to function as the polarization state converting element in the optical arrangement.

18. The head mounted display of claim 15, wherein an incoming polarization state of light received by the waveguide display is a linear polarization state that is oriented at a selected angle relative to an angle of gratings of the input coupler to enhance in-coupling of light into the waveguide plate.

* * * * *